(12) United States Patent
Wang (10) Patent No.: US 11,294,225 B2
(45) Date of Patent: Apr. 5, 2022

(54) LIQUID CRYSTAL GLASSES AND LIQUID CRYSTAL DISPLAY PANEL WITH LIGHT LEAKAGE ELIMINATION ELEMENT

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/264,908

(22) PCT Filed: May 14, 2020

(86) PCT No.: PCT/CN2020/090210
§ 371 (c)(1),
(2) Date: Feb. 1, 2021

(87) PCT Pub. No.: WO2020/233494
PCT Pub. Date: Nov. 26, 2020

(65) Prior Publication Data
US 2021/0325727 A1    Oct. 21, 2021

(30) Foreign Application Priority Data
May 21, 2019    (CN) .......................... 201910425188.7

(51) Int. Cl.
*G02F 1/1335*    (2006.01)
*G02F 1/1343*    (2006.01)

(52) U.S. Cl.
CPC .. *G02F 1/133548* (2021.01); *G02F 1/133512* (2013.01); *G02F 1/133514* (2013.01); *G02F 1/133526* (2013.01); *G02F 1/134309* (2013.01)

(58) Field of Classification Search
None
See application file for complete search history.

(56) References Cited

U.S. PATENT DOCUMENTS

| | | | | |
|---|---|---|---|---|
| 4,670,095 A | * | 6/1987 | Negishi | ................... G02B 1/10 430/321 |
| 2001/0055145 A1 | * | 12/2001 | Hamada | ................... G02B 3/14 359/290 |

(Continued)

FOREIGN PATENT DOCUMENTS

| | | |
|---|---|---|
| CN | 1773315 A | 5/2006 |
| CN | 103064211 A | 4/2013 |

(Continued)

OTHER PUBLICATIONS

China Patent Office, First Office Action dated Dec. 2, 2020, for corresponding Chinese application 201910425188.7.

*Primary Examiner* — Ryan Crockett
(74) *Attorney, Agent, or Firm* — Houtteman Law LLC (57) ABSTRACT

Provided are liquid crystal glasses and display panel having light leakage elimination element. Glasses includes: opposite first and second substrates; first electrode on side of first substrate facing second substrate; second electrode on side of second substrate facing first substrate and on side of first electrode distal to first substrate; liquid crystal layer between first and second electrodes; lens unit including valid and invalid areas, one of which converges to collimated light by refraction and the other diverges parallel light through refraction; light leakage elimination element between second electrode and lens unit, including wire grid polarizer and half-wave plate sequentially away from the second electrode, orthographic projections of light leakage elimination element and invalid area on second substrate at least partially overlapping; light blocking element on side of liquid crystal layer distal to second electrode and prevents light passing through light leakage elimination element and invalid area from exiting glasses.

20 Claims, 5 Drawing Sheets

(56) References Cited

U.S. PATENT DOCUMENTS

| | | |
|---|---|---|
| 2005/0117095 A1 | 6/2005 | Ma |
| 2006/0103768 A1 | 5/2006 | Yee et al. |
| 2014/0160400 A1* | 6/2014 | Hou .................. G02F 1/133634 349/96 |
| 2016/0363781 A1* | 12/2016 | Wu ........................ G02B 30/27 |
| 2018/0101054 A1 | 4/2018 | Zha |
| 2018/0107064 A1 | 4/2018 | Bai |
| 2018/0314064 A1* | 11/2018 | Kasazumi .............. G02B 30/54 |
| 2019/0278129 A1 | 9/2019 | Zhu et al. |
| 2020/0033694 A1 | 1/2020 | Gao |
| 2020/0355951 A1 | 11/2020 | Chen et al. |

FOREIGN PATENT DOCUMENTS

| | | |
|---|---|---|
| CN | 103135280 A | 6/2013 |
| CN | 103676322 A | 3/2014 |
| CN | 105700233 A | 6/2016 |
| CN | 105700268 A | 6/2016 |
| CN | 106707608 A | 5/2017 |
| CN | 107219573 A | 9/2017 |
| CN | 107656379 A | 2/2018 |
| CN | 108427222 A | 8/2018 |
| CN | 108717243 A | 10/2018 |
| CN | 108873505 A | 11/2018 |
| CN | 110146994 A | 8/2019 |
| JP | H07333557 A | 12/1995 |
| JP | 2003029255 A | 1/2003 |

* cited by examiner

LIQUID CRYSTAL GLASSES AND LIQUID CRYSTAL DISPLAY PANEL WITH LIGHT LEAKAGE ELIMINATION ELEMENT

TECHNICAL FIELD

The present disclosure relates to the field of display technology, and particularly relates to liquid crystal glasses and a liquid crystal display panel with a light leakage elimination element.

BACKGROUND

Currently, in a liquid crystal optical device having a lens or an equivalent lens, there is a problem of light leakage due to the non-ideality of the lens.

For example, existing varifocal glasses usually integrate a lens unit such as a Fresnel lens and a liquid crystal on a glass lens, and the lens unit and the liquid crystal together realize change of the focal length of the glasses. However, the non-ideality of the lens unit causes light leakage in the varifocal glasses and causes stray light spots, which affects the viewing effect.

For example, in a display panel in which a liquid crystal layer is configured as a plurality of liquid crystal lenses to control a display gray scale, the liquid crystal lenses also have non-ideality, which causes appearance of stray light and light leakage, and reduces the contrast of the display panel.

SUMMARY

In an aspect, the present disclosure provides liquid crystal glasses, including: a first substrate and a second substrate opposite to each other; a first electrode on a side of the first substrate facing the second substrate; a second electrode on a side of the second substrate facing the first substrate and on a side of the first electrode distal to the first substrate; a liquid crystal layer between the first electrode and the second electrode; a lens unit between the second electrode and the liquid crystal layer and including a valid area and an invalid area, one of the valid area and the invalid area being configured to converge to a collimated light beam through refraction, and the other of the valid area and the invalid area being configured to diverge a parallel light beam through refraction; a light leakage elimination element between the second electrode and the lens unit, an orthographic projection of the light leakage elimination element on the second substrate and an orthographic projection of the invalid area on the second substrate at least partially overlapping, and the light leakage elimination element including a wire grid polarizer and a half-wave plate stacked in sequence in a direction away from the second electrode; and a light blocking element on a side of the liquid crystal layer distal to the second electrode and configured to prevent light passing through the light leakage elimination element and the invalid area from being emitted out of the liquid crystal glasses.

In some embodiments, the orthographic projection of the light leakage elimination element on the second substrate and an orthographic projection of the valid area on the second substrate do not overlap.

In some embodiments, the lens unit is a Fresnel lens, the Fresnel lens includes a plurality of lens protrusions each including a first side surface and a second side surface that intersect with each other, a component, which has a first polarization direction, of a parallel light beam entering the lens protrusions is refracted to be converged at the first side surface, and is refracted to be diverged at the second side surface. The lens unit includes a plurality of valid areas and a plurality of invalid areas, each of the plurality of valid areas is defined by the first side surface and is configured to converge the component of the parallel light beam having the first polarization direction by refraction, each of the plurality of invalid area is defined by the second side surface and is configured to diverge the component of the parallel light beam having the first polarization direction by refraction. The orthographic projection of the light leakage elimination element on the second substrate at least partially overlaps with an orthographic projection of at least one of the plurality of invalid areas on the second substrate.

In some embodiments, the wire grid polarizer is configured to block light having a second polarization direction perpendicular to the first polarization direction, and a width of the wire grid polarizer in the first polarization direction ranges from 6 μm to 30 μm.

In some embodiments, a width of the half-wave plate in the first polarization direction is smaller than the width of the wire grid polarizer in the first polarization direction.

In some embodiments, a difference between the widths of the wire grid polarizer and the half-wave plate ranges from 0.4 μm to 0.8 μm.

In some embodiments, the liquid crystal glasses include a plurality of the light leakage elimination elements, and an orthographic projection of each of the plurality of invalid areas on the second substrate at least partially overlaps with an orthographic projection on the second substrate of a corresponding one of the plurality of light leakage elimination elements.

In some embodiments, the light blocking element is a polarizer.

In some embodiments, the polarizer is on a side of the first substrate distal to the lens unit.

In some embodiments, the light blocking element is an upper liquid crystal cell on a side of the first substrate distal to the lens unit. The upper liquid crystal cell includes: a third substrate and a fourth substrate opposite to each other, a third electrode on a side of the third substrate close to the fourth substrate, a fourth electrode on a side of the fourth substrate close to the third substrate and on a side of the third electrode distal to the third substrate, an upper liquid crystal layer between the third electrode and the fourth electrode, and an upper light leakage elimination element between the fourth electrode and the upper liquid crystal layer and including an upper wire grid polarizer, an orthographic projection of the upper light leakage elimination element on the second substrate overlapping with the orthographic projection of the light leakage elimination element on the second substrate, and the upper wire grid polarizer being configured to block light having a second polarization direction perpendicular to the first polarization direction.

In some embodiments, the upper light leakage elimination element further includes an upper half-wave plate stacked on the upper wire grid polarizer and distal to the fourth electrode.

In some embodiments, a width of the upper wire grid polarizer in the first polarization direction ranges from 6 μm to 30 μm.

In some embodiments, a width of the upper half-wave plate in the first polarization direction is smaller than the width of the upper wire grid polarizer in the first polarization direction.

In some embodiments, the upper liquid crystal cell further includes: an upper lens unit between the upper liquid crystal layer and the upper light leakage elimination element and including a valid area and an invalid area, one of the valid area and the invalid area of the upper lens unit being configured to converge a component of the parallel light beam having the first polarization direction by refraction, and the other of the valid area and the invalid area of the upper lens unit being configured to diverge the component of the parallel beam having the first polarization direction by refraction. An orthographic projection of the invalid area of the upper lens unit on the second substrate overlaps with the orthographic projection of the invalid area of the lens unit on the second substrate.

In an aspect, the present disclosure provides a liquid crystal display panel, including: a first substrate and a second substrate opposite to each other; a first electrode on a side of the first substrate facing the second substrate; a second electrode on a side of the second substrate facing the first substrate and on a side of the first electrode distal to the first substrate; a color adjustment layer including a color filter pattern and a black matrix pattern that are alternately arranged; a liquid crystal layer between the first electrode and the second electrode and including a valid area and an invalid area, an orthographic projection of the invalid area on the second substrate overlapping with an orthographic projection, on the second substrate, of a part of the black matrix pattern adjoining an adjacent color filter pattern, and the valid area being a portion of the liquid crystal layer other than the invalid area; and a light leakage elimination element between the second electrode and the liquid crystal layer, an orthographic projection of the light leakage elimination element on the second substrate and an orthographic projection of the invalid area on the second substrate at least partially overlapping, and the light leakage elimination element including a wire grid polarizer and a half-wave plate stacked in sequence in a direction away from the second electrode. The black matrix pattern prevents light passing through the light leakage elimination element and the invalid area from being emitted out of the liquid crystal display panel.

In some embodiments, the orthographic projection of the light leakage elimination element on the second substrate and an orthographic projection of the valid area on the second substrate do not overlap.

In some embodiments, the liquid crystal display panel further includes a liquid crystal control element configured to control a liquid crystal control voltage applied to the first electrode and the second electrode such that the liquid crystal layer is configured as a plurality of liquid crystal prisms, each of the plurality of liquid crystal prisms having a different angle between a light incident surface and a light emergent surface under a different liquid crystal control voltage.

In some embodiments, the wire grid polarizer is configured to block light having a second polarization direction perpendicular to the first polarization direction, and a width of the wire grid polarizer in the first polarization direction ranges from 3 μm to 20 μm.

In some embodiments, a width of the half-wave plate in the first polarization direction is smaller than the width of the wire grid polarizer in the first polarization direction.

In some embodiments, a difference between the widths of the wire grid polarizer and the half-wave plate ranges from 0.1 μm to 0.4 μm.

DETAILED DESCRIPTION

In order to enable those of ordinary skill in the art to better understand the technical solutions of the present disclosure, a filter structure, glasses, and a display panel of the present disclosure will be described in further detail below with reference to the accompanying drawings and specific implementations.

Varifocal glasses have a variable focal length, so it is suitable for hyperopia and nearsighted eyes. Existing varifocal glasses usually realize change of the focal length of the glasses through a lens unit such as a Fresnel lens and a liquid crystal. Under an existing processing condition, the Fresnel lens 19 in the existing varifocal glasses has problems. As shown in FIGS. 1 to 4, the Fresnel lens 19 includes a plurality of lens protrusions 191, and each lens protrusion 191 includes a first side surface S1 and a second side surface S2 that intersect with each other. Ideally, within one pitch of the Fresnel lens 19, the second side surface S2 is perpendicular to a bottom surface of the Fresnel lens, but due to process errors, there is an anchor angle error of 15°. In this case, parallel light beams entering the lens protrusion 191 are refracted and converged at the first side surface S1, and are refracted and diverged at the second side surface S2. Therefore, an invalid area 3 defined by the second side surface S2 and the corresponding bottom surface will cause the original light to deviate from a predetermined direction and scatter, which eventually causes stray light spots and affects viewing of human eyes.

Figure 5:
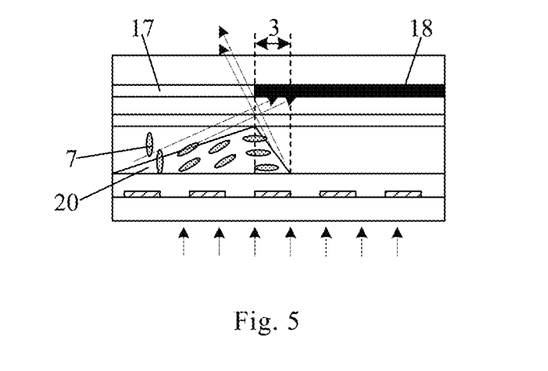
FIG. 5 is a cross-sectional view and an optical path diagram of a liquid crystal display panel according to some embodiments.

In addition, an existing liquid crystal display panel usually realizes control of a polarization direction of light by arranging an upper polarizer and a lower polarizer. In order to improve light utilization efficiency of the liquid crystal display panel, as shown in FIG. 5, deflection of the liquid crystal 7 may be controlled such that the deflected liquid crystal 7 in an area corresponding to each pixel is equivalent to a lens structure (such as a liquid crystal prism 20), and the lens structure can allow light irradiated into each pixel area to be partially deflected and then enters a black matrix 18, so as to control the display gray scale of the display panel. The display panel does not need to be provided with a polarizer, thereby improving the light utilization rate. However, the equivalent lens structure formed by the deflected liquid crystal 7 also has the above light leakage problem caused by the invalid area 3 of the lens in the varifocal glasses.

Accordingly, the present disclosure provides a light leakage elimination element, and liquid crystal glasses and a liquid crystal display panel having the light leakage elimination element, which can at least solve one of the above problems.

In an aspect, the present disclosure provides liquid crystal glasses, including: a first substrate, a second substrate, a first electrode, a second electrode, a liquid crystal layer, a lens unit, a light leakage elimination element and a light blocking element. The first substrate and the second substrate are opposite to each other. The first electrode is on a side of the first substrate facing the second substrate. The second electrode is on a side of the second substrate facing the first substrate and on a side of the first electrode distal to the first substrate. The liquid crystal layer is between the first electrode and the second electrode. The lens unit is between the second electrode and the liquid crystal layer and has a valid area and an invalid area, one of the valid area and the invalid area is configured to converge a collimated light beam by refraction, and the other of the valid area and the invalid area is configured to diverge a parallel beam by refraction. The light leakage elimination element is between the second electrode and the lens unit, an orthographic projection of the light leakage elimination element on the second substrate and an orthographic projection of the invalid area on the second substrate at least partially overlap, and the light leakage elimination unit includes a wire grid polarizer and a half-wave plate stacked in sequence in a direction away from the second electrode. The light blocking element is on a side of the liquid crystal layer distal to the second electrode and configured to prevent light passing through the light leakage elimination element and the invalid area from being emitted out of the liquid crystal glasses.

Figure 6:
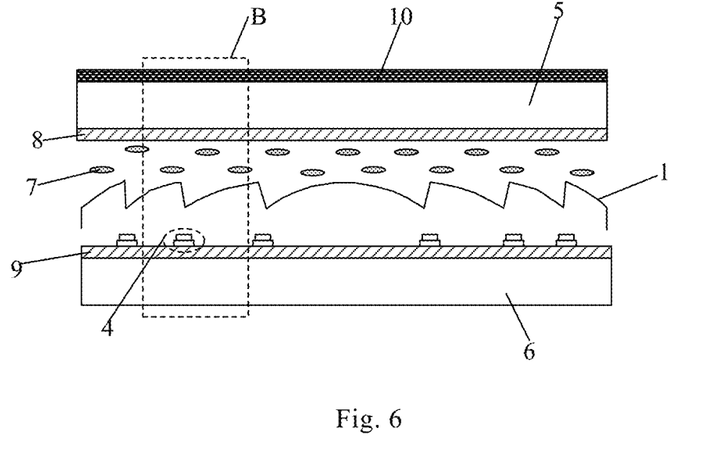
FIG. 6 is a structural cross-sectional view of liquid crystal glasses according to an embodiment of the present disclosure.
Figure 7:
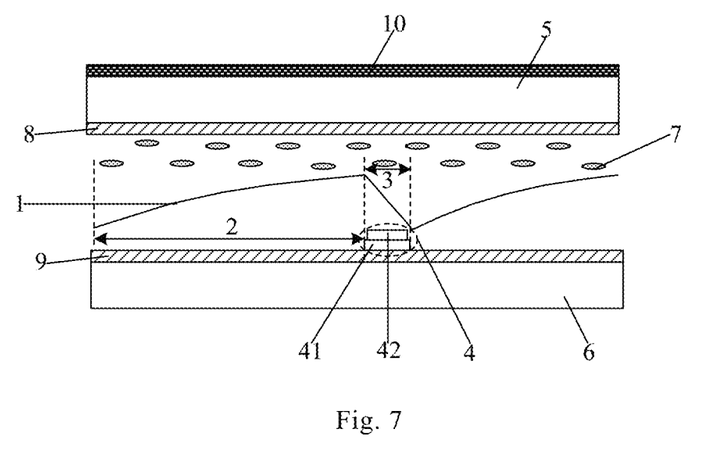
FIG. 7 is an enlarged view of part B in FIG. 6.
Figure 8:
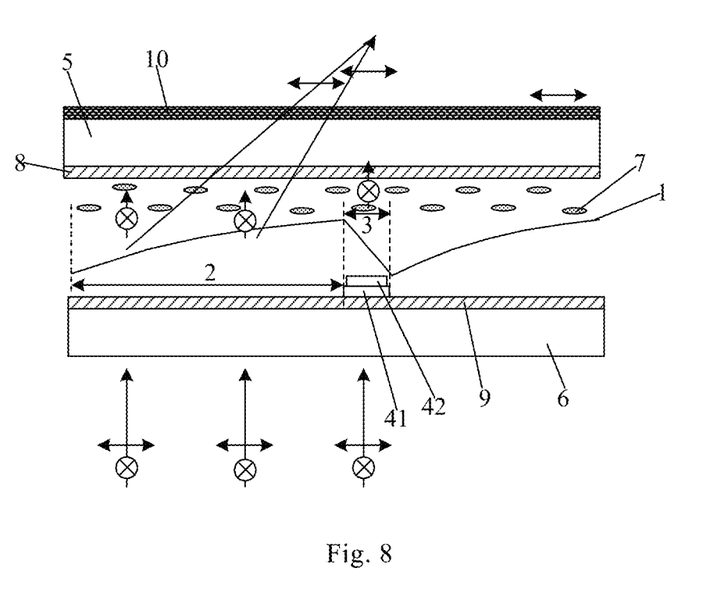
FIG. 8 is an optical path diagram of liquid crystal glasses (e.g., the liquid crystal glasses shown in FIG. 6) according to an embodiment of the present disclosure.

FIGS. 6 to 8 show an example of liquid crystal glasses having a light leakage elimination element. The liquid crystal glasses include: a first substrate 5, a second substrate 6, a first electrode 8, a second electrode 9, a liquid crystal layer, a lens unit 1, a light leakage elimination element 4 and a light blocking element 10. The first substrate 5 and the second substrate 6 are disposed opposite to each other. The first electrode 8 is disposed on a side of the first substrate 5 facing the second substrate 6. The second electrode 9 is disposed on a side of the second substrate 6 facing the first substrate 5 and on a side of the first electrode 8 distal to the first substrate 5. The liquid crystal layer includes liquid crystal molecules 7 and is filled between the first electrode 8 and the second electrode 9. The lens unit 1 is disposed between the second electrode 9 and the liquid crystal layer 1. The light leakage elimination element 4 is disposed between the second electrode 9 and the lens unit 1. The light blocking element 10 is disposed on a side of the liquid crystal distal to the second electrode 9 and configured to prevent light passing through the light leakage elimination element 4 and the invalid area 3 from being emitted out of the liquid crystal glasses.

The lens unit 1 includes a valid area 2 and an invalid area 3. The valid area 2 is configured to refract incident light into a target area, and the invalid area 3 can refract incident light into an area outside the target area. For example, one of the valid area 2 and the invalid area 3 is configured to converge a collimated light beam through refraction, and the other of the valid area 2 and the invalid area 3 is configured to diverge parallel beams through refraction.

The light leakage elimination unit 4 includes a wire grid polarizer 41 and a half-wave plate 42 stacked in sequence in a direction away from the second electrode 9, and an orthographic projection of the light leakage elimination element 4 on the second substrate 6 and an orthographic projection of the invalid area 3 on the second substrate 6 at least partially overlap. In some embodiments, the orthographic projection of the light leakage elimination element 4 on the second substrate 6 and an orthographic projection of the valid area 2 on the second substrate 6 do not overlap. The light leakage elimination unit 4 can change the polarization direction of light incident into the invalid area 3 to prevent the light incident into the invalid area 3 from being refracted to an area other than the target area.

The target area refers to a normal imaging area. The area outside the target area refers to an area where no image should be formed. An image in the area outside the target area will interfere with an image in the target area, so that imaging effect of the image is affected, and thus viewing effect of human eyes are affected.

With the light leakage elimination element 4 including a wire grid polarizer and a half-wave plate, the liquid crystal glasses can change the polarization direction of the light incident to the invalid area 3 of the lens unit 1, so as to prevent light incident to the invalid area 3 from being refracted to an area outside the target area. Therefore, interference between light in the area outside the target area and light in the target area is avoided, which in turn ensures the imaging effect of the light in the target area, and ultimately ensures the viewing effect of human eyes.

In the embodiment, the light blocking element 10 is a polarizer 10, which is disposed on a side of the first substrate 5 distal from the second substrate 6. The polarizer 10 can allow light having a first polarization direction among incident light to pass therethrough. The liquid crystal 7 can be deflected under the action of an electric field formed after the first electrode 8 and the second electrode 9 are applied with a voltage.

Figure 1:
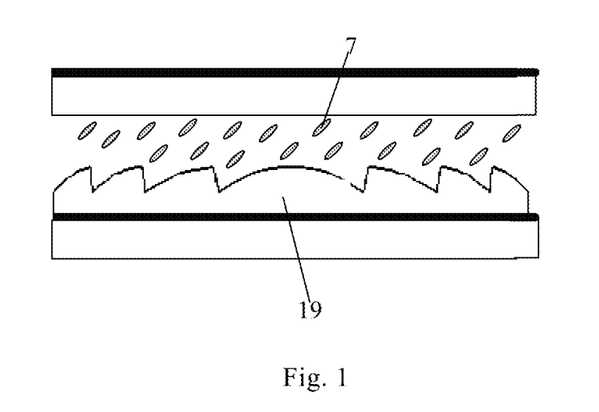
FIG. 1 is a structural cross-sectional view of an existing varifocal glasses.
Figure 2:
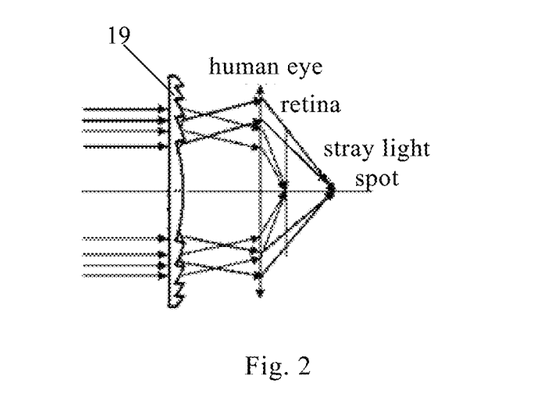
FIG. 2 is an optical path diagram of an existing varifocal glasses.
Figure 3:
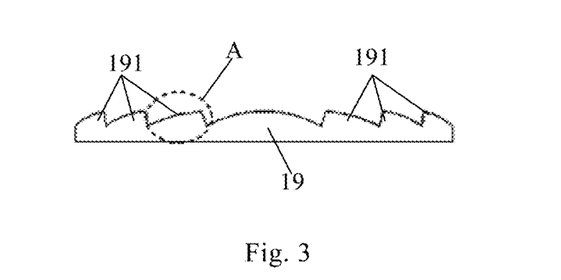
FIG. 3 is a structural cross-sectional view of a Fresnel lens in an existing varifocal glasses.
Figure 4:
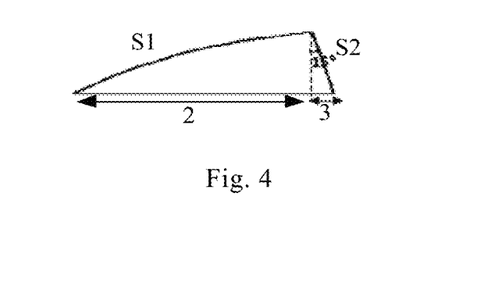
FIG. 4 is an enlarged view of part A in FIG. 3.

In some embodiments, the lens unit 1 is a Fresnel lens, for example, the Fresnel lens 19 shown in FIG. 3. The Fresnel lens 19 includes a plurality of lens protrusions 191, each of the plurality of lens protrusions 191 includes a first side surface S1 and a second side surface S2 that intersect each other, and a component having a first polarization direction of a parallel light beam entering the lens protrusion is refracted and converged at the first side surface S1, and the component having the first polarization direction and of the parallel light beam entering the lens protrusion 191 is refracted and diverged at the second side surface S2. The first side surface and the bottom surface of each lens protrusion define a valid area 2. The valid area 2 is configured to converge the component of the parallel light beam having the first polarization direction by refraction. The second side surface and the bottom surface of each lens protrusion define an invalid area 3, and the invalid area 3 is configured to diverge the component of the parallel beam having the first polarization direction by refraction. In other words, the invalid area 3 is an area in which an included angle of a serrated structure of the Fresnel lens is located. The Fresnel lens cooperates with the liquid crystal 7 to allow light having the first polarization direction among the incident light to change its focal length and to be converged. The light leakage elimination unit 4 is disposed between the second electrode 9 and the Fresnel lens.

In the embodiment, the liquid crystal glasses may be varifocal glasses. The varifocal effect of the varifocal glasses is suitable for hyperopia and nearsighted eyes to wear for watching. In the liquid crystal glasses, a light path passing through the valid area 2 of the lens unit 1 is shown in FIG. 8. When external natural light is emitted to the glasses, the natural light enters from the second substrate 6 and exits from the first substrate 5 to enter a human eye. Natural light includes circularly polarized light and elliptically polarized light. Here, the natural light is decomposed into light having a first polarization direction and light having a second polarization direction perpendicular to the first polarization direction. It is assumed that the light having the first polarization direction is horizontally polarized light and the light having the second polarization direction is vertically polarized light. Light incident into the valid area of the Fresnel lens 2 includes horizontally polarized light and vertically polarized light. The Fresnel lens only changes an optical path of the horizontally polarized light, but does not change an optical path of the vertically polarized light. The polarizer 10 can allow horizontally polarized light in the incident light to pass therethrough. The liquid crystal 7 only changes a propagation direction of light, but does not change the polarization direction of light. The horizontally polarized light in the incident light is deflected after passing through the Fresnel lens, and under the combined action of the deflected liquid crystal 7, emergent light is converged on the retina of the human eye after passing through the polarizer 10, so that the natural light enters the human eye after passing through the varifocal sunglasses. In addition, the vertically polarized light in the incident light is not modulated by the Fresnel lens, and is still substantially perpendicularly emitted to the first substrate 5. Because its polarization direction is different from the transmission axis of the polarizer 10, this part of the light is absorbed and is not emitted out. Therefore, the polarizer 10 can allow the sunglasses to play a role of preventing bright sunlight dazzle.

The wire grid polarizer 41 may be configured to allow light having a first polarization direction among incident light to pass therethrough and block light having a second polarization direction perpendicular to the first polarization direction. In some embodiments, the wire grid polarizer 41 is a metal wire grid polarizer.

A light path passing through the invalid area 3 of the lens unit 1 is shown in FIG. 8. After light emitted to the invalid area 3 passes through the wire grid polarizer 41, the vertically polarized light in the natural light is absorbed; the remaining horizontally polarized light is emitted on the half-wave plate 42 through the wire grid polarizer 41 and is converted into vertically polarized light after passing through the half-wave plate 42. The converted vertically polarized light is not modulated when passing through the Fresnel lens, still travels substantially perpendicularly to and passes through the first substrate 5, is then absorbed when passing through the polarizer 10, and thus cannot be emitted out. Therefore, the light leakage elimination unit 4 can prevent the light emitted to the invalid area 3 from being emitted to an area outside the target area, thereby ensuring the imaging effect of light in the target area, and ultimately ensuring the viewing effect of the human eye.

In some embodiments, a width of the wire grid polarizer 41 in the first polarization direction ranges from 6 μm to 30 μm. In some embodiments, a width of the half-wave plate 42 in the first polarization direction is smaller than the width of the wire grid polarizer 41 in the first polarization direction. In some embodiments, a difference between the widths of the wire grid polarizer 41 and the half-wave plate 42 ranges from 0.4 μm to 0.8 μm. With such setting, the light emitted to the invalid area 3 can be better prevented from being emitted to the area outside the target area, thereby ensuring the imaging effect of the light in the target area, and ultimately ensuring the viewing effect of the human eye.

It should be noted that the width of the half-wave plate 42 in the first polarization direction may also be equal to the width of the wire grid polarizer 41 in the first polarization direction.

In some embodiments, the liquid crystal glasses include a plurality of light leakage elimination elements 4, and an orthographic projection of each of the plurality of invalid areas 3 on the second substrate 6 and an orthographic projection of a corresponding one of the plurality of light leakage elimination elements 4 on the second substrate 6 at least partially overlap. For example, as shown in FIG. 6, there are a plurality of invalid areas 3 of the Fresnel lens, and there are a plurality of light leakage elimination units 4, and the plurality of light leakage elimination units 4 are arranged in a one-to-one correspondence with the plurality of invalid areas 3. Since the Fresnel lens has the plurality of invalid areas 3, each invalid area 3 is provided therein with a light leakage elimination unit 4 correspondingly, which can completely prevent the light emitted to the invalid area 3 from being emitted to the area other than the target area, thereby preventing light supposed to be emitted to the target area from being emitted to the area outside the target area, further ensuring the imaging effect of the light in the target area, and ultimately ensuring the viewing effect of the human eye.

In addition, it should be noted that the varifocal glasses are used to meet watching requirements of nearsighted or hyperopia eyes because of its variable focal length. When the focal length of the varifocal glasses is not changed, that is, when the varifocal glasses do not change a myopic degree or a hyperopia degree by changing the focal length, the technical problems in the present disclosure no longer exists. For example, when the lens unit 1 no longer plays a role of refracting light (for example, the lens unit 1 is no longer provided in the glasses), the invalid area 3 of the lens unit 1 no longer exists, and the stray light spot problem in the invalid area 3 no longer exists. In this case, the light leakage elimination element 4 no longer plays the role of preventing the light emitted to the invalid area 3 from being emitted to the area other than the target area.

In the embodiment, other essential structures, such as an alignment film, an insulating layer, a planarization layer, etc., may be provided in the liquid crystal glasses serving as varifocal glasses, and are not shown and will not be described in detail herein.

Figure 9:
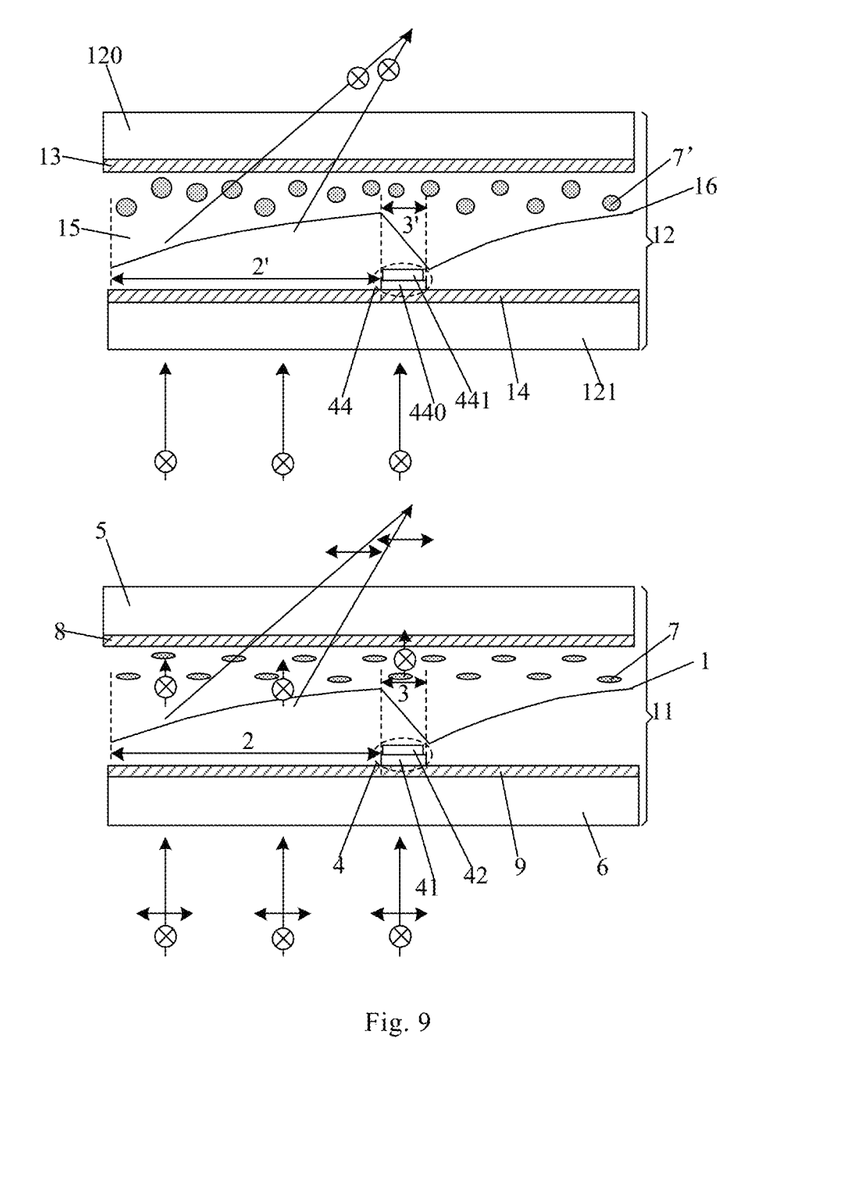
FIG. 9 is a structural cross-sectional view and an optical path diagram of liquid crystal glasses according to an embodiment of the present disclosure.

FIG. 9 shows another example of liquid crystal glasses having a light leakage elimination element. Different from the example of the liquid crystal glasses described with reference to FIGS. 6 to 8, in the liquid crystal glasses shown in FIG. 9, the light blocking element is an upper liquid crystal cell 12 on a side of the first substrate 5 distal to the lens unit 1. In this case, the first substrate 5, the second substrate 6, the first electrode 8, the second electrode 9, the liquid crystal layer having the liquid crystal 7, the lens unit 1 and the light leakage elimination element 4 may constitute a lower liquid crystal cell 11.

The upper liquid crystal cell 12 includes: a third substrate 120 and a fourth substrate 121 disposed opposite to each other, a third electrode 13 disposed on a side of the third substrate 120 close to the fourth substrate 121, a fourth electrode 14 disposed on a side of the fourth substrate 121 close to the third substrate 120 and on a side of the third electrode 13 distal to the third substrate 120, an upper liquid crystal layer 15 disposed between the third electrode 13 and the fourth electrode 14, and an upper light leakage elimination element 44. The upper light leakage elimination element 44 is disposed between the fourth electrode 14 and the upper liquid crystal layer 15, and includes an upper wire grid polarizer 440 and an upper half-wave plate 441. An orthographic projection of the upper light leakage elimination element 44 on the second substrate 6 and the orthographic projection of the light leakage elimination element 4 on the second substrate 6 overlap, and the upper wire grid polarizer 440 is configured to block light having the second polarization direction perpendicular to the first polarization direction. The liquid crystal 7' of the upper liquid crystal layer 15 can be deflected under the action of an electric field formed after the third electrode 13 and the fourth electrode 14 are applied with a voltage.

The upper liquid crystal cell 12 may further include: an upper lens unit 16 between the upper liquid crystal layer 15 and the upper light leakage elimination element 44, the upper lens unit 16 includes a valid area and an invalid area, and one of the valid area and the invalid area of the upper lens unit 16 is configured to converge a component of a parallel beam having the first polarization direction by refraction, and the other is configured to diverge the component of the parallel beam having the first polarization direction by refraction.

In some embodiments, the upper lens unit 16 is a second Fresnel lens 16. The second Fresnel lens 16 is disposed between the upper liquid crystal layer 15 and the fourth electrode 14. The second Fresnel lens 16 and the upper liquid crystal layer 15 cooperate with each other to allow light having the second polarization direction in the incident light to be converged after zooming; the first polarization direction is perpendicular to the second polarization direction. The first polarization direction is the horizontal polarization direction, and the second polarization direction is the vertical polarization direction. Similar to the Fresnel lens 1, the second Fresnel lens 16 may include a valid area 2' and an invalid area 3'.

In the liquid crystal glasses, natural light enters from the second substrate 6 and exits from the upper liquid crystal cell 12 to enter a human eye. The incident light is natural light, which includes light in two polarized states, namely, horizontally polarized light and vertically polarized light. Both the Fresnel lens 1 and the second Fresnel lens 16 only change an optical path of the horizontally polarized light, but do not change an optical path of the vertically polarized light. For the valid area of the Fresnel lens, after the natural light passes through the lower liquid crystal cell 11, because the Fresnel lens 1 changes the optical path of the horizontally polarized light and the liquid crystal 7 is horizontally oriented, the horizontally polarized light is modulated and focused to a focal point; in addition, the vertically polarized light is collimated and emitted to the upper liquid crystal cell 12, because the second Fresnel lens 16 in the upper liquid crystal cell 12 does not change the optical path of the vertically polarized light and the liquid crystal 7' in the upper liquid crystal cell 12 is vertically oriented, the vertically polarized light is deflected and focused to a focal point, so that emergent light is converged on the retina of the human eye.

In some embodiments, the upper wire grid polarizer 440 is a metal wire grid polarizer. The other part of the external natural light emitted into the varifocal glasses is emitted to the invalid area 3, after passing through the first wire grid polarizer 430 in the first liquid crystal cell 11, the vertically polarized light in the natural light is absorbed; the remaining horizontally polarized light is emitted to the first half-wave plate 431 and is converted into vertically polarized light after passing through the first half-wave plate 431; the vertically polarized light is collimated and emitted to the second liquid crystal cell 12, the second wire grid polarizer 440 only allows horizontally polarized light to pass therethrough because the transmission axis of the second wire grid polarizer 440 in the second liquid crystal cell 12 is the same as that of the first wire grid polarizer 430, the converted vertically polarized light is completely absorbed and cannot be emitted out from the second wire grid polarizer 440. Therefore, the light leakage elimination unit 4 can prevent the light emitted to the invalid area 3 from being emitted to the area outside the target area, thereby preventing light supposed to be emitted to the target area from entering the area outside the target area, further ensuring the imaging effect of the light in the target area, and ultimately ensuring the viewing effect of the human eye.

In some embodiments, the upper light leakage elimination unit 44 may include only an upper wire grid polarizer 440, that is, in the absence of the upper half-wave plate 441, light emitted to the invalid area 3 can be completely prevented from being emitted to the area outside the target area.

In some embodiments, a width of the upper wire grid polarizer 440 in the first polarization direction ranges from 6 μm to 30 μm. In some embodiments, a width of the upper half-wave plate 441 in the first polarization direction is smaller than the width of the upper wire grid polarizer 440 in the first polarization direction. In some embodiments, a difference between the widths of the upper wire grid polarizer 440 and the upper half-wave plate 441 ranges from 0.4 μm to 0.8 μm. With such setting, the light emitted to the invalid area 3 can be better prevented from being emitted to the area outside the target area, thereby ensuring the imaging effect of the light in the target area, and ultimately ensuring the viewing effect of the human eye.

It should be noted that the width of the upper half-wave plate 441 in the first polarization direction may also be equal to the width of the upper wire grid polarizer 440 in the first polarization direction.

In some embodiments, an orthographic projection of the invalid area of the upper lens unit 16 on the second substrate 6 overlaps with the orthographic projection of the invalid area of the lens unit 1 on the second substrate 6.

In some embodiments, the upper liquid crystal cell 12 includes a plurality of upper light leakage elimination elements 44, and an orthographic projection of each of the plurality of invalid areas 3' on the second substrate 6 at least partially overlaps with an orthographic projection of a corresponding one of the plurality of upper light leakage elimination elements 44 on the second substrate 6 at least partially overlap. For example, the upper Fresnel lens 16 has a plurality of invalid areas 3', and there are a plurality of upper light leakage elimination elements 44, and the plurality of upper light leakage elimination elements 44 are in a one-to-one correspondence with the plurality of invalid areas 3' of the upper Fresnel lens 16.

In the embodiment, the liquid crystal glasses serving as ordinary varifocal glasses may also be provided with other essential structures, such as an alignment film, an insulating layer, a planarization layer, etc., which are not shown and will not be repeated herein.

In an aspect, the present disclosure provides a liquid crystal display panel, including: a first substrate, a second substrate, a first electrode, a second electrode, a color adjustment layer, a liquid crystal layer, and light leakage elimination elements. The first substrate and the second substrate are disposed opposite to each other. The first electrode is disposed on a side of the first substrate facing the second substrate. The second electrode is disposed on a side of the second substrate facing the first substrate and on a side of the first electrode distal to the first substrate. The color adjustment layer is disposed on a side the liquid crystal layer distal to the second electrode and includes color filter patterns and black matrix patterns, the color filter patterns and black matrix patterns being alternately arranged. The liquid crystal layer is filled between the first electrode and the second electrode and includes valid areas and invalid areas, an orthographic projection of the invalid area on the second substrate overlaps with an orthographic projection of a part of the black matrix pattern on the second substrate, the part of the black matrix pattern adjoins a color filter pattern adjacent to the black matrix pattern, and the valid areas are portions of the liquid crystal layer other than the invalid areas. The light leakage elimination elements are disposed between the second electrode and the liquid crystal layer, an orthographic projection of the light leakage elimination element on the second substrate and an orthographic projection of the invalid area on the second substrate at least partially overlap, and the light leakage elimination element includes a wire grid polarizer and a half-wave plate sequentially stacked in a direction away from the second electrode. The black matrix patterns block light passing through the light leakage elimination elements and the invalid areas from exiting the liquid crystal display panel.

Figure 10:
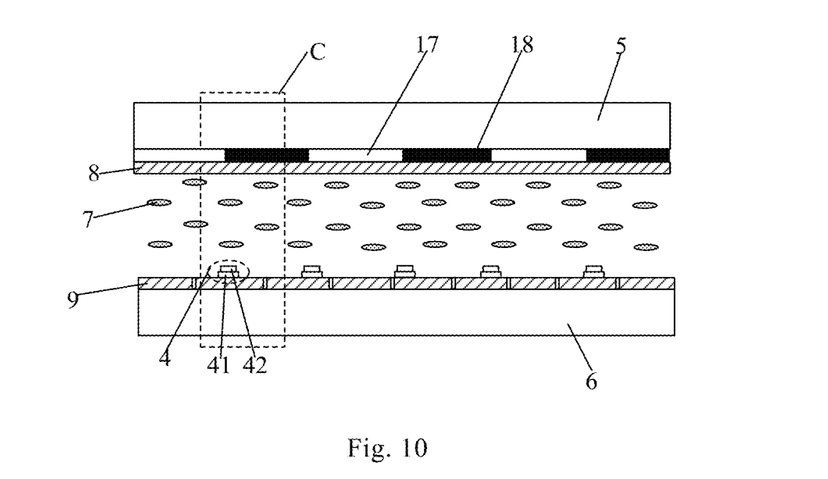
FIG. 10 is a structural cross-sectional view of a liquid crystal display panel according to an embodiment of the present disclosure.
Figure 11:
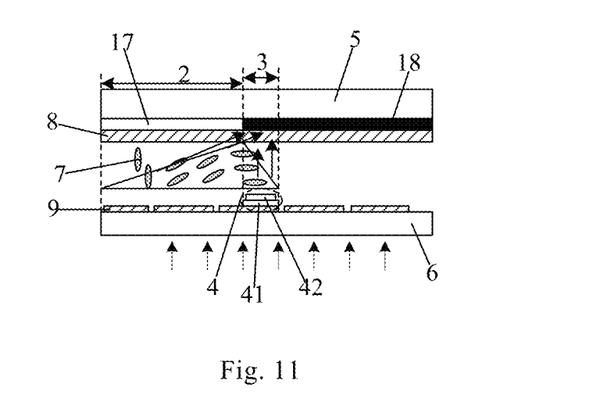
FIG. 11 is an enlarged view and an optical path diagram of part C in FIG. 10.

FIGS. 10 and 11 show an example of a liquid crystal display panel according to an embodiment of the present disclosure. As shown in FIGS. 10 and 11, the liquid crystal display panel includes: a first substrate 5, a second substrate 6, a first electrode 8, a second electrode 9, a color adjustment layer, a liquid crystal layer, and light leakage elimination elements 4. The first substrate 5 and the second substrate 6 are disposed opposite to each other. The first electrode 8 is disposed on a side of the first substrate 5 facing the second substrate 6. The second electrode 9 is disposed on a side of the second substrate 6 facing the first substrate 5 and on a side of the first electrode 8 distal to the first substrate 5. The color adjustment layer includes colors filter patterns 17 and black matrix patterns 18 that are alternately arranged. The liquid crystal layer includes liquid crystal 7 and is filled between the first electrode 8 and the second electrode 9, the liquid crystal layer includes valid areas 2 and invalid areas 3, an orthographic projection of the invalid area 3 of the black matrix pattern 18 on the second substrate 6 overlaps with an orthographic projection of a part of the black matrix pattern 18 adjoining its adjacent color filter pattern 17 on the second substrate 6, and the valid areas are portions of the liquid crystal layer other than the invalid areas. The light leakage elimination elements 4 are disposed between the second electrode 9 and the liquid crystal layer, an orthographic projection of the light leakage elimination element 4 on the second substrate 6 and an orthographic projection of the invalid area 3 on the second substrate 6 at least partially overlap, and the light leakage elimination element 4 includes a wire grid polarizer 41 and a half-wave plate 42 that are stacked in sequence in a direction away from the second electrodes 9. The black matrix patterns 18 block light passing through the light leakage elimination element 4 and the invalid areas 3 from exiting the liquid crystal display panel.

In some embodiments, the orthographic projections of the light leakage elimination elements 4 on the second substrate 6 do not overlap with the orthographic projections of the valid areas 2 on the second substrate 6.

In some embodiments, the color filter patterns 17 and the black matrix patterns 18 are disposed between the first substrate 5 and the first electrode 8.

The liquid crystal display panel according to an embodiment of the present disclosure may further include a liquid crystal control element configured to control a liquid crystal control voltage applied to the first electrode 8 and the second electrode 9 such that the liquid crystal layer is configured as a plurality of liquid crystal prisms, each of the plurality of liquid crystal prisms has a different angle between a light incident surface and a light emergent surface under a different liquid crystal control voltage. In other words, under the control of the voltage, the liquid crystal layer may be equivalent to a plurality of prisms. Similar to the Fresnel lens described above, the liquid crystal prism is also non-ideal, and may also include a valid area and an invalid area.

In the liquid crystal display panel, deflection of the liquid crystal 7 under the action of an electric field is used to control the gray scale. Under the black matrix, through regulating effect of voltages applied to the electrodes, different forms of liquid crystal prisms are formed to deflect light at different angles. For example, in a case where the gray scale is 255 (i.e., L255), no liquid crystal control voltage is applied. At this time, the liquid crystal 7 does not form a prism, light passing through the liquid crystal 7 is not deflected and emitted upward to the color filter patterns 17 directly, and the color filter patterns 17 are excited to emit red, green and blue (RGB) light. In this case, the gray scale is the largest, which is defined as L255. In a case of L0, an appropriate voltage is applied to the second electrode 9 to cause the liquid crystal prism to form the largest inclination angle (i.e., the angle between the light incident surface and the light emergent surface of the prism), so that most of the light is deflected to the black matrix patterns 18. In this case, no light is emitted out from the display panel, and gray scale 0 (i.e., L0) is defined. In a case of an intermedia gray scale, liquid crystal prisms with different inclination angles are formed by adjusting the liquid crystal control voltage, and the gray scale is controlled by controlling the amount of deflected light emitted from the liquid crystal prism. The display panel realizes control of display gray scale without upper and lower polarizers, so that the overall thickness of the display panel is reduced, and at the same time the light transmittance is improved, thereby improving the light utilization rate.

In order to cause the liquid crystal 7 to form liquid crystal prisms having different inclination angles, in some embodiments, the first electrode 8 is a flat electrode, and the second electrode 9 is a strip electrode. The form of the liquid crystal prism is adjusted by controlling the voltage of the second electrode 9, so as to form liquid crystal prisms with different inclination angles. Needless to say, the first electrode 8 and the second electrode 9 may also be electrodes of other forms, as long as the formed electric field can control the liquid crystal 7 to deflect to form liquid crystal prisms with different inclination angles.

In the display panel, when the liquid crystal prism achieves control of a gray scale other than 255, stray light will be generated in the invalid area 3, which causes light leakage and reduces the display contrast of the display panel.

The wire grid polarizer 41 may be configured to allow light having a first polarization direction among incident light to pass therethrough and block light having a second polarization direction perpendicular to the first polarization direction. In some embodiments, the wire grid polarizer 41 includes a metal wire grid polarizer.

The light having the first polarization direction is horizontally polarized light, and the light having the second polarization direction is vertically polarized light. In the embodiment, after passing through the wire grid polarizer, backlight turns into horizontally polarized light to enter the display panel from the side of the second substrate 6 without passing through a polarizer, which can improve the light utilization rate of the display panel. The horizontally polarized light emitted to the valid area 2 of the liquid crystal prism can be displayed normally; the horizontally polarized light emitted to the invalid area 3 of the liquid crystal prism passes through the wire grid polarizer 41, then this part of the light turns, after passing through the half-wave plate 42, into vertically polarized light, and the vertically polarized light is collimated and emitted to the black matrix 18, so that it is absorbed by the black matrix 18 and cannot be emitted out. Therefore, when realizing display of a certain gray scale, light that is not needed for display is emitted to the black matrix 18, which avoids light leakage caused by out-emission of light that is not needed for display and in turn improves display contrast and display effect of the display panel.

In some embodiments, a width of the wire grid polarizer 41 in the first polarization direction ranges from 3 µm to 20 µm. In some embodiments, a width of the half-wave plate 42 in the first polarization direction is smaller than the width of the wire grid polarizer 41 in the first polarization direction. In some embodiments, a difference between the widths of the wire grid polarizer 41 and the half-wave plate 42 ranges from 0.1 µm to 0.4 µm. With such setting, light incident to the invalid area 3 can be better prevented from reaching an area outside the black matrix 18, so that the light that is not needed for display is emitted to the black matrix 18, which avoids light leakage caused by out-emission of light that is not needed for display and in turn improves display contrast and display effect of the display panel.

It should be noted that the width of the half-wave plate 42 in the first polarization direction may also be equal to the width of the wire grid polarizer 41 in the first polarization direction.

In the embodiment, there are a plurality of invalid areas 3, there are also a plurality of light leakage elimination units 4, and the plurality of light leakage elimination units 4 are disposed in a one-to-one correspondence with the plurality of invalid areas 3. Since the liquid crystal prism has a plurality of invalid areas 3, each invalid area 3 is provided therein with a corresponding one of the plurality of light leakage elimination units 4, and thus the light incident to the invalid area 3 can be completely prevented from reaching the area outside the black matrix 18, so that the light that is not needed for display is emitted to the black matrix 18, which avoids light leakage caused by out-emission of light that is not needed for display and in turn improves display contrast and display effect of the display panel.

In the embodiment, the liquid crystal display panel may also include other essential structures, such as an alignment film, an insulating layer, a planarization layers, etc., which are not shown and will not be repeated herein.

It could be understood that the above implementations are merely exemplary implementations adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. Liquid crystal glasses, comprising:
   a first substrate and a second substrate opposite to each other;
   a first electrode on a side of the first substrate facing the second substrate;
   a second electrode on a side of the second substrate facing the first substrate and on a side of the first electrode distal to the first substrate;
   a liquid crystal layer between the first electrode and the second electrode;
   a lens unit between the second electrode and the liquid crystal layer and comprising a valid area and an invalid area, one of the valid area and the invalid area being configured to converge to a collimated light beam through refraction, and the other of the valid area and the invalid area being configured to diverge a parallel light beam through refraction;
   a light leakage elimination element between the second electrode and the lens unit, an orthographic projection of the light leakage elimination element on the second substrate at least partially overlapping with an orthographic projection of the invalid area on the second substrate, and the light leakage elimination element comprising a wire grid polarizer and a half-wave plate stacked in sequence in a direction away from the second electrode; and
   a light blocking element on a side of the liquid crystal layer distal to the second electrode and configured to prevent light passing through the light leakage elimination element and the invalid area from being emitted out of the liquid crystal glasses.

2. The liquid crystal glasses of claim 1, wherein the orthographic projection of the light leakage elimination element on the second substrate does not overlap with an orthographic projection of the valid area on the second substrate.

3. The liquid crystal glasses of claim 1, wherein the lens unit is a Fresnel lens, the Fresnel lens comprises a plurality of lens protrusions each comprising a first side surface and a second side surface that intersect with each other, a component, which has a first polarization direction, of a parallel light beam entering the lens protrusions is refracted at the first side surface to be converged, and is refracted at the second side surface to be diverged,
   the lens unit comprises a plurality of valid areas and a plurality of invalid areas, each of the plurality of valid areas is defined by the first side surface and is configured to converge the component of the parallel light beam having the first polarization direction by refraction, each of the plurality of invalid area is defined by the second side surface and is configured to diverge the component of the parallel light beam having the first polarization direction by refraction, and
   the orthographic projection of the light leakage elimination element on the second substrate at least partially overlaps with an orthographic projection of at least one of the plurality of invalid areas on the second substrate.

4. The liquid crystal glasses of claim 3, wherein the wire grid polarizer is configured to block light having a second polarization direction perpendicular to the first polarization direction, and a width of the wire grid polarizer in the first polarization direction is in a range of 6 µm to 30 µm.

5. The liquid crystal glasses of claim 4, wherein a width of the half-wave plate in the first polarization direction is smaller than the width of the wire grid polarizer in the first polarization direction.

6. The liquid crystal glasses of claim 5, wherein a difference between the widths of the wire grid polarizer and the half-wave plate is in a range of 0.4 µm to 0.8 µm.

7. The liquid crystal glasses of claim 3, wherein the liquid crystal glasses comprise a plurality of the light leakage elimination elements, and an orthographic projection of each of the plurality of invalid areas on the second substrate at least partially overlaps with an orthographic projection on the second substrate of a corresponding one of the plurality of light leakage elimination elements.

8. The liquid crystal glasses of claim 3, wherein the light blocking element is a polarizer.

9. The liquid crystal glasses of claim 8, wherein the polarizer is on a side of the first substrate distal to the lens unit.

10. The liquid crystal glasses of claim 3, wherein the light blocking element is an upper liquid crystal cell on a side of the first substrate distal to the lens unit, and the upper liquid crystal cell comprises:
a third substrate and a fourth substrate opposite to each other,
a third electrode on a side of the third substrate close to the fourth substrate,
a fourth electrode on a side of the fourth substrate close to the third substrate and on a side of the third electrode distal to the third substrate,
an upper liquid crystal layer between the third electrode and the fourth electrode, and
an upper light leakage elimination element between the fourth electrode and the upper liquid crystal layer and comprising an upper wire grid polarizer, an orthographic projection of the upper light leakage elimination element on the second substrate overlapping with the orthographic projection of the light leakage elimination element on the second substrate, and the upper wire grid polarizer being configured to block light having a second polarization direction perpendicular to the first polarization direction.

11. The liquid crystal glasses of claim 10, wherein the upper light leakage elimination element further comprises an upper half-wave plate stacked on the upper wire grid polarizer and distal to the fourth electrode.

12. The liquid crystal glasses of claim 11, wherein a width of the upper wire grid polarizer in the first polarization direction is in a range of 6 µm to 30 µm.

13. The liquid crystal glasses of claim 12, wherein a width of the upper half-wave plate in the first polarization direction is smaller than the width of the upper wire grid polarizer in the first polarization direction.

14. The liquid crystal glasses of claim 10, wherein the upper liquid crystal cell further comprises: an upper lens unit between the upper liquid crystal layer and the upper light leakage elimination element and comprising a valid area and an invalid area, wherein one of the valid area and the invalid area of the upper lens unit is configured to converge a component of the parallel light beam having the first polarization direction by refraction, and the other of the valid area and the invalid area of the upper lens unit is configured to diverge the component of the parallel beam having the first polarization direction by refraction, and
an orthographic projection of the invalid area of the upper lens unit on the second substrate overlaps with the orthographic projection of the invalid area of the lens unit on the second substrate.

15. A liquid crystal display panel, comprising:
a first substrate and a second substrate opposite to each other;
a first electrode on a side of the first substrate facing the second substrate;
a second electrode on a side of the second substrate facing the first substrate and on a side of the first electrode distal to the first substrate;
a color adjustment layer comprising a color filter pattern and a black matrix pattern that are alternately arranged;
a liquid crystal layer between the first electrode and the second electrode and comprising a valid area and an invalid area, wherein an orthographic projection of the invalid area on the second substrate overlaps with an orthographic projection on the second substrate of a part of the black matrix pattern adjoining an adjacent color filter pattern, and the valid area is a portion of the liquid crystal layer other than the invalid area; and
a light leakage elimination element between the second electrode and the liquid crystal layer, wherein an orthographic projection of the light leakage elimination element on the second substrate and an orthographic projection of the invalid area on the second substrate at least partially overlap, and the light leakage elimination element comprises a wire grid polarizer and a half-wave plate stacked in sequence in a direction away from the second electrode,
wherein the black matrix pattern prevents light passing through the light leakage elimination element and the invalid area from being emitted out of the liquid crystal display panel.

16. The liquid crystal display panel of claim 15, wherein the orthographic projection of the light leakage elimination element on the second substrate does not overlap with an orthographic projection of the valid area on the second substrate.

17. The liquid crystal display panel of claim 15, further comprising a liquid crystal control element configured to control a liquid crystal control voltage applied to the first electrode and the second electrode such that the liquid crystal layer is configured as a plurality of liquid crystal prisms, wherein each of the plurality of liquid crystal prisms has a different angle between a light incident surface and a light emergent surface under a different liquid crystal control voltage.

18. The liquid crystal display panel of claim 15, wherein the wire grid polarizer is configured to block light having a second polarization direction perpendicular to the first polarization direction, and a width of the wire grid polarizer in the first polarization direction is in a range of 3 µm to 20 µm.

19. The liquid crystal display panel of claim 15, wherein a width of the half-wave plate in the first polarization direction is smaller than a width of the wire grid polarizer in the first polarization direction.

20. The liquid crystal display panel of claim 19, wherein a difference between the widths of the wire grid polarizer and the half-wave plate is in a range of 0.1 µm to 0.4 µm.

* * * * *